(12) United States Patent
Ito

(10) Patent No.: US 12,570,210 B2
(45) Date of Patent: Mar. 10, 2026

(54) CONTROL APPARATUS FOR VEHICLE

(71) Applicant: SUBARU CORPORATION, Tokyo (JP)

(72) Inventor: Takuya Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/800,425

(22) Filed: Aug. 12, 2024

(65) Prior Publication Data

US 2025/0091510 A1 Mar. 20, 2025

(30) Foreign Application Priority Data

Sep. 19, 2023 (JP) ................................. 2023-151079

(51) Int. Cl.
B60Q 5/00 (2006.01)
(52) U.S. Cl.
CPC .................................... B60Q 5/008 (2013.01)
(58) Field of Classification Search
CPC ..................................................... B60Q 5/008
See application file for complete search history.

(56) References Cited

U.S. PATENT DOCUMENTS

| | | | |
|---|---|---|---|
| 2006/0098839 A1* | 5/2006 | Ishigaki | H04R 9/046 |
| | | | 381/409 |
| 2014/0015654 A1 | 1/2014 | Nakayama et al. | |
| 2019/0071011 A1* | 3/2019 | Konno | B60Q 5/00 |
| 2021/0300242 A1* | 9/2021 | Konno | H04R 5/04 |

FOREIGN PATENT DOCUMENTS

JP 2014-15187 A 1/2014

* cited by examiner

*Primary Examiner* — James J Yang
(74) *Attorney, Agent, or Firm* — Rimon P.C.

(57) ABSTRACT

A control apparatus for a vehicle includes a first speaker and a second speaker. The first speaker is disposed at a front part of the vehicle and toward a right side in a vehicle width direction of the vehicle. The first speaker is configured to output a notification sound that notifies the surroundings of the vehicle of an approach of the vehicle. The second speaker is disposed at the front part of the vehicle and toward a left side in the vehicle width direction. The second speaker is configured to output the notification sound. The first speaker and the second speaker have an integrated structure with respect to each other and are opposed to each other in the vehicle width direction. The first speaker and the second speaker are configured to simultaneously receive, from an amplifier, a same audio signal as each other on which the notification sound is based.

7 Claims, 4 Drawing Sheets

CONTROL APPARATUS FOR VEHICLE

CROSS-REFERENCE TO RELATED APPLICATIONS

The present application claims priority from Japanese Patent Application No. 2023-151079 filed on Sep. 19, 2023, the entire contents of which are hereby incorporated by reference.

BACKGROUND

The disclosure relates to a control apparatus for a vehicle which is adapted to control a notification sound that notifies the surroundings of an approach of the vehicle.

In recent years, there are vehicles that are able to travel without using an engine, such as an electric vehicle or a hybrid vehicle. These vehicles do not output an engine sound, making it difficult for a person such as a pedestrian to recognize the approach of the vehicle in response to the engine sound of the vehicle.

At present, in each country, the vehicle able to travel without using the engine, such as the electric vehicle or the hybrid vehicle, is being legally regulated so as to notify a person such as the pedestrian of the approach of the vehicle by outputting a notification sound. In addition, the notification sound including a sound pressure equal to or higher than a specified value is to be outputted as the notification sound that is to be outputted from the vehicle able to travel without using the engine.

For example, according to Japanese laws or regulations, the vehicle able to travel without using the engine is to output a sound pressure equal to or higher than a specified value in two frequency bands among frequency bands in which frequencies from 160 Hz to 5 kHz are divided by 16 every ⅓ octave, from the start of the vehicle to a timing at which the vehicle reaches 20 km/h.

Japanese Unexamined Patent Application Publication (JP-A) No. 2014-15187 discloses a vehicle presence notification apparatus that includes a first notification sound generation device and a second notification sound generation device. The first notification sound generation device causes a notification sound based on a high-frequency sound to be outputted toward the front of a vehicle. The second notification sound generation device causes a notification sound based on a low-frequency sound to be outputted downward from the vehicle.

The high-pitched notification sound from the first notification sound generation device has high directivity and is outputted toward the front of the vehicle. The high-pitched notification sound is outputted to a predetermined range on the front side of the vehicle, and is actively delivered to a pedestrian in front of the vehicle.

The low-pitched notification sound from the second notification sound generation device has low directivity and is outputted downward from the vehicle. The low-pitched notification sound is reflected on a road surface to be outputted to a wide range around the vehicle, and is actively delivered to pedestrians on sides of the vehicle and at the rear of the vehicle.

SUMMARY

An aspect of the disclosure provides a control apparatus for a vehicle. The control apparatus includes a first speaker and a second speaker. The first speaker is disposed at a front part of the vehicle and toward a right side in a vehicle width direction of the vehicle. The first speaker is configured to output a notification sound. The notification sound is configured to notify the surroundings of the vehicle of an approach of the vehicle. The second speaker is disposed at the front part of the vehicle and toward a left side in the vehicle width direction. The second speaker is configured to output the notification sound. The first speaker and the second speaker have an integrated structure with respect to each other and are opposed to each other in the vehicle width direction. The first speaker and the second speaker are configured to simultaneously receive, from an amplifier, a same audio signal as each other on which the notification sound is based.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
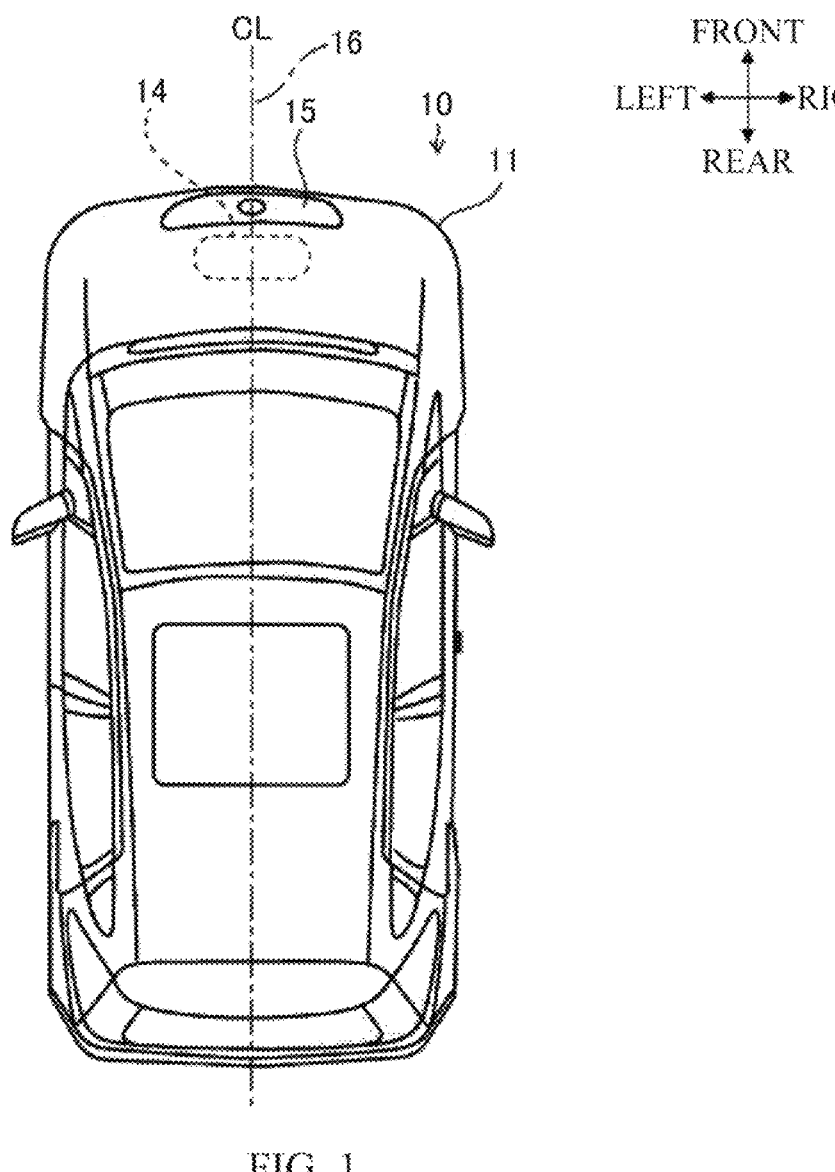
FIG. 1 is a plan diagram illustrating a vehicle including a control apparatus for the vehicle according to one example embodiment of the disclosure.

The vehicle presence notification apparatus disclosed in JP-A No. 2014-15187 includes a first notification sound generation device intended for a pedestrian in front of the vehicle, and a second notification sound generation device intended for pedestrians on sides of the vehicle and at the rear of the vehicle. This structure makes different from each other the directions in which the notification sounds are outputted, which necessitates an increase in the volume of notification sounds to be outputted from the first notification sound generation device and the second notification sound generation device in order to meet the requirements of applicable laws or regulations. Accordingly, this structure can lead to an increase the volume of the notification sound leaking into a vehicle compartment of the vehicle, thus making it difficult to ensure quietness of the vehicle compartment in the vehicle.

It is desirable to provide a control apparatus for a vehicle which makes it possible to achieve quietness in a vehicle compartment.

In the following, a control apparatus for a vehicle 10 according to some example embodiments of the disclosure is described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

It should be noted that a front-rear direction of the drawings indicates a longitudinal direction of a vehicle 11, a left-right direction of the drawings indicates a vehicle width direction of the vehicle 11, and a vertical direction of the drawings indicates a height direction of the vehicle 11.

Figure 2:
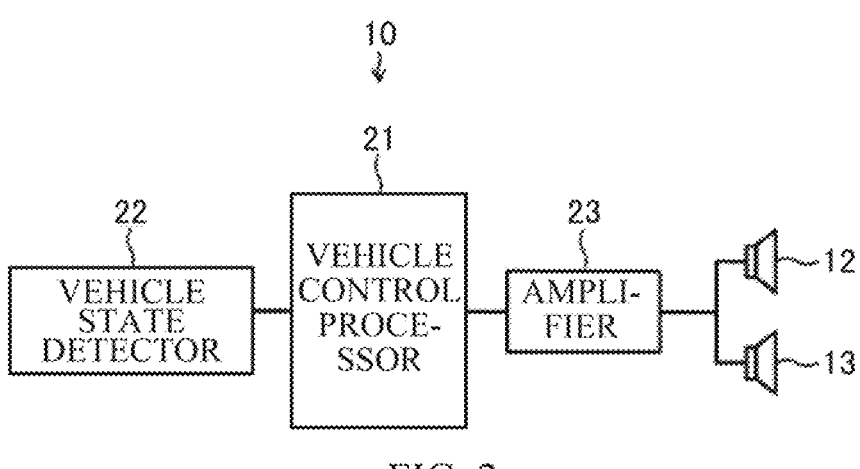
FIG. 2 is a block diagram illustrating the control apparatus for the vehicle illustrated in FIG. 1.
Figures 3A, 3B:
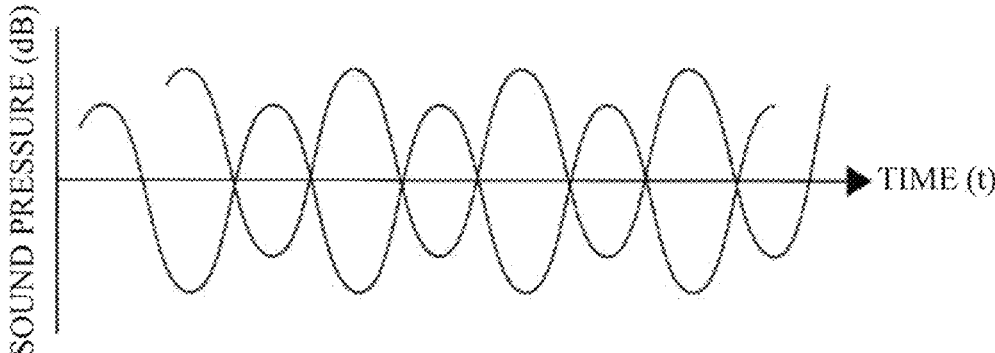
FIG. 3A is a cross-sectional diagram illustrating a speaker structure of the control apparatus for the vehicle illustrated in FIG. 1.
FIG. 3B is a graph illustrating the control apparatus for the vehicle illustrated in FIG. 1.
Figure 4:
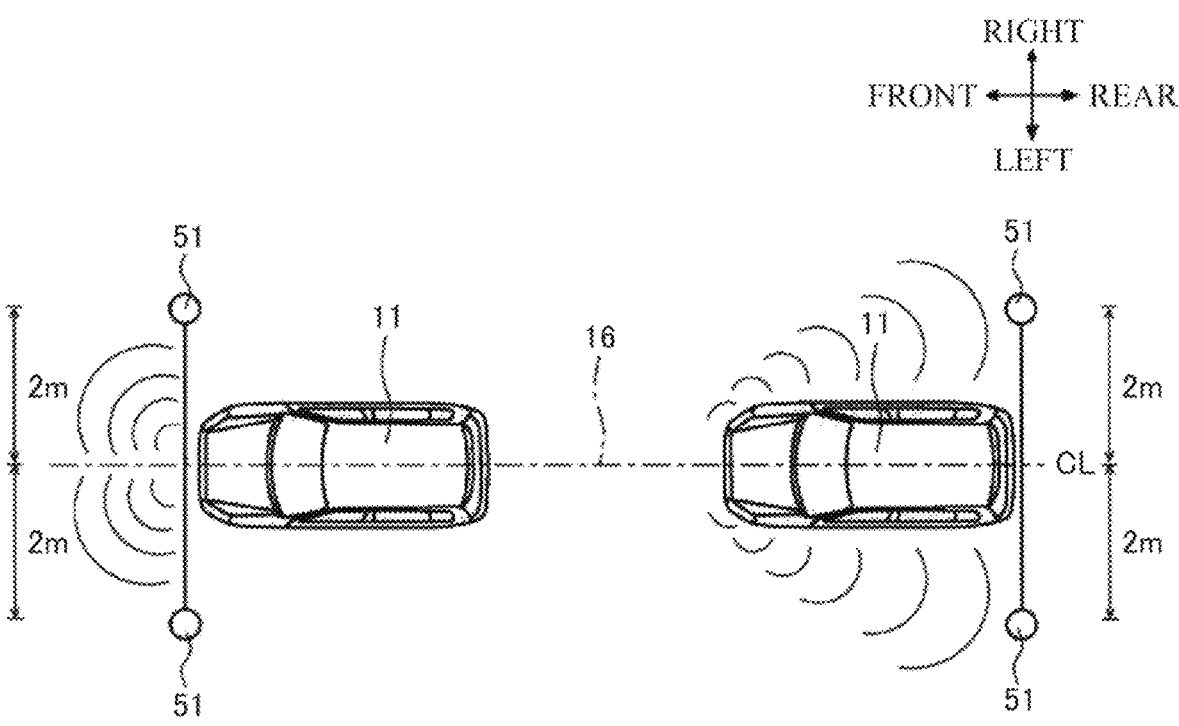
FIG. 4 is a plan diagram illustrating a sound pressure measurement test of the control apparatus for the vehicle illustrated in FIG. 1.
Figure 5:
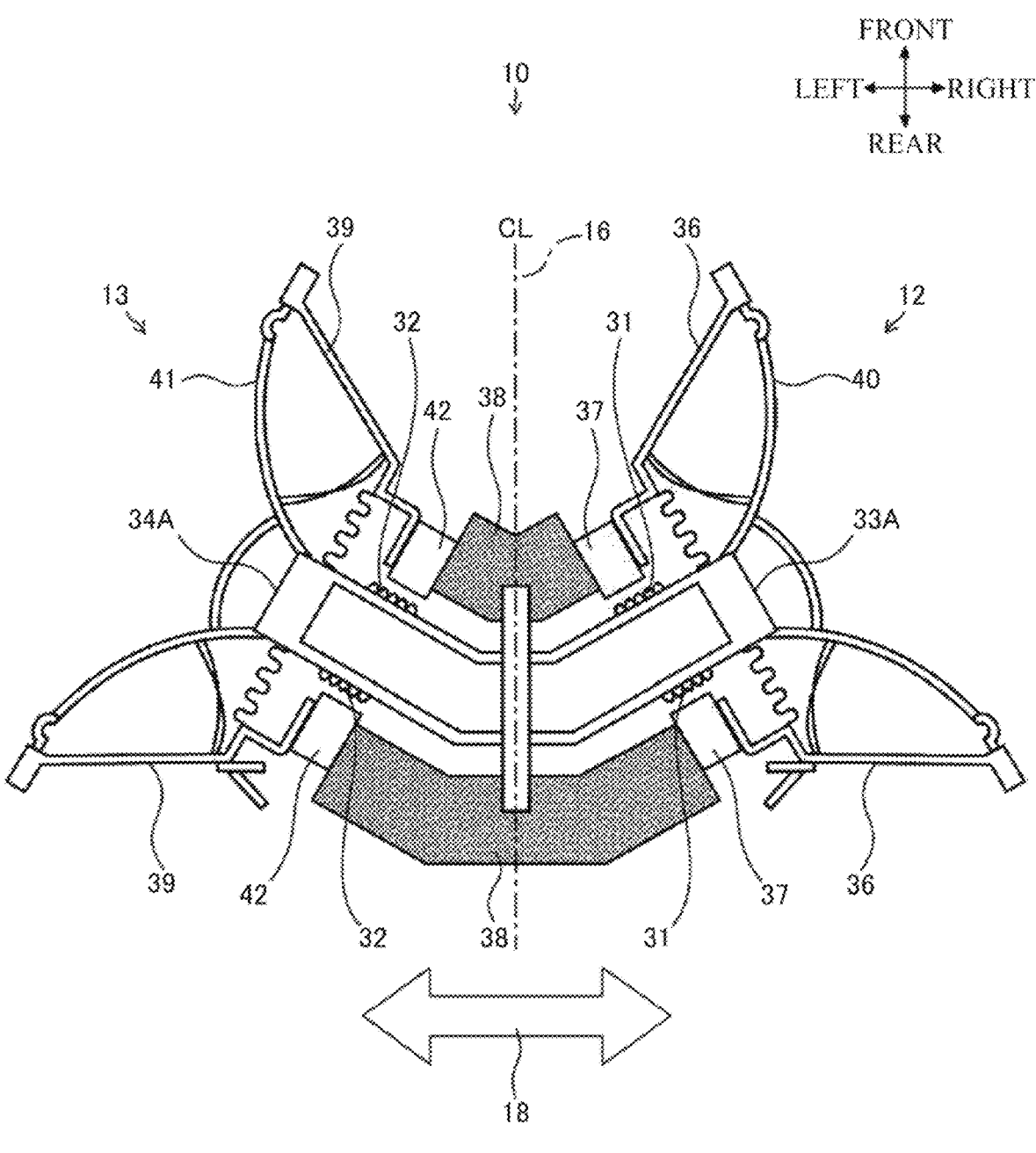
FIG. 5 is a cross-sectional diagram illustrating a speaker structure of the control apparatus for the vehicle according to a modification example.

FIG. 1 is a plan diagram illustrating the vehicle 11 including the control apparatus for the vehicle 10 according to an example embodiment. Hereinafter, the control apparatus for the vehicle 10 may be simply referred to as a "vehicle control apparatus 10". FIG. 2 is a block diagram illustrating the vehicle control apparatus 10. FIG. 3A is a cross-sectional diagram illustrating structures of a first speaker 12 and a second speaker 13 of the vehicle control apparatus 10. FIG. 3B is a graph illustrating a state of notification sounds to be outputted from the first speaker 12 and the second speaker 13 of the vehicle control apparatus 10. FIG. 4 is a plan diagram illustrating a sound pressure measurement test of the vehicle control apparatus 10. FIG. 5 is a cross-sectional diagram illustrating a modification example of structures of the first speaker 12 and the second speaker 13 of the vehicle control apparatus 10.

Referring to FIG. 1, the vehicle 11 may be any electric vehicle such as a battery electric vehicle (BEV), a hybrid electric vehicle (HEV), or a plug-in hybrid electric vehicle (PHEV).

According to Japanese laws or regulations, the vehicle 11 able to travel without using an engine is to output a sound pressure equal to or higher than a specified value in two frequency bands among frequency bands in which frequencies from 160 Hz to 5 kHz are divided by 16 every ⅓ octave, from the start of the vehicle 11 to a timing at which the vehicle 11 reaches 20 km/h. Further, as will be described later in greater detail, a sound pressure measurement test according to Japanese laws or regulations defines the requirements to be described with reference to FIG. 4.

The vehicle control apparatus 10 according to the example embodiment includes a first speaker 12 and a second speaker 13 both illustrated by way of example in FIG. 2. The first speaker 12 and the second speaker 13 are each a device that notifies the surroundings of the vehicle 11 of a notification sound. For example, as indicated by a dotted line 14 in FIG. 1, the first speaker 12 and the second speaker 13 are provided at a front part of the vehicle 11. The first speaker 12 and the second speaker 13 may be disposed in a tuft between a front grille 15 and an unillustrated radiator. A dashed-dotted line 16 may indicate a center line CL of the vehicle 11 in the vehicle width direction. In some embodiments, the first speaker 12 and the second speaker 13 may be disposed line-symmetrically with respect to the center line CL of the vehicle 11. The first speaker 12 is opposed toward a right side of the vehicle 11 in the vehicle width direction, and the second speaker 13 is opposed toward a left side of the vehicle 11 in the vehicle width direction.

Referring to FIG. 2, the vehicle control apparatus 10 may include a vehicle control processor 21, a vehicle state detector 22, an amplifier 23, the first speaker 12, and the second speaker 13.

The vehicle control processor 21 may include devices including, for example, a central processing unit (CPU), a read-only memory (ROM), and a random-access memory (RAM). The vehicle control processor 21 may be an electronic control unit (ECU) having one or more processors configured to execute various calculations adapted to control, for example, an unillustrated driving device of the vehicle 11, such as a motor.

The vehicle control processor 21 may include an unillustrated storage. The storage may be configured by a nonvolatile memory such as an electrically erasable programmable read-only memory (EEPROM). The storage may store various pieces of data necessary for the calculations to be executed by the vehicle control processor 21 and one or more programs executable by the one or more processors. The storage may store data such as audio data of the notification sound that meets the requirements of applicable laws or regulations.

The vehicle state detector 22 may be a sensor configured to detect a traveling state of the vehicle 11. Non-limiting examples of the vehicle state detector 22 may include a vehicle speed sensor. The vehicle speed sensor may detect a speed of the vehicle 11 and output a detection signal obtained by the detection to the vehicle control processor 21. Based on the detection signal, the vehicle control processor 21 may determine whether the traveling state of the vehicle 11 corresponds to a state in which the notification sound is to be outputted in accordance with the applicable laws or regulations.

The amplifier 23 may convert the audio data of the notification sound received from the vehicle control processor 21 into an audio signal, and output the audio signal to the first speaker 12 and the second speaker 13. As will be described later in greater detail, the amplifier 23 may be coupled to the first speaker 12 and the second speaker 13, and outputs the same audio signal to the first speaker 12 and the second speaker 13 at the same timing or simultaneously. The amplifier 23 and the first and the second speakers 12 and 13 may be coupled to each other to cause the first speaker 12 and the second speaker 13 to receive the same audio signal from the amplifier 23 at the same timing or simultaneously.

The first speaker 12 and the second speaker 13 each may be a dynamic speaker, for example. The first speaker 12 and the second speaker 13 may output the notification sounds to the outside of the vehicle 11, based on the audio signal received from the amplifier 23.

Referring to FIG. 3A, the first speaker 12 and the second speaker 13 may be provided at a location that is in a body frame and inside the tuft between the front grille 15 illustrated in FIG. 1 and the unillustrated radiator. The first speaker 12 is opposed toward the right side of the vehicle 11 in the vehicle width direction, and the second speaker 13 is opposed toward the left side of the vehicle 11 in the vehicle width direction. The first speaker 12 and the second speaker 13 may respectively include bobbins 33 and 34 around which respective voice coils 31 and 32 are wound. The bobbins 33 and 34 may have an integral structure with respect to each other via a yoke 35.

In one embodiment, the voice coil 31 may serve as a "first voice coil". In one embodiment, the voice coil 32 may serve as a "second voice coil". In one embodiment, the bobbin 33 may serve as a "first bobbin". In one embodiment, the bobbin 34 may serve as a "second bobbin".

In the example embodiment, the bobbins 33 and 34 may be formed to have a linear shape. As indicated by a dotted line 17, an axial center of the bobbin 33 of the first speaker 12 and an axial center of the bobbin 34 of the second speaker 13 may be coaxially positioned in the vehicle width direction of the vehicle 11. The first speaker 12 and the second speaker 13 has the integral structure with respect to each other, and may be so disposed as to be line-symmetrical with respect to the center line CL, indicated by the dashed-dotted line 16, in the vehicle width direction of the vehicle 11.

The first speaker 12 may include: a frame 36; a plate 37 fixed to the frame 36; the voice coil 31 disposed between the plate 37 and the bobbin 33; and a magnet 38 fixed to an end of the yoke 35. The first speaker 12 may form a magnetic circuit by the yoke 35, the magnet 38, and the voice coil 31 wound around the bobbin 33.

The second speaker 13 may include: a frame 39; a plate 42 fixed to the frame 39; the voice coil 32 disposed between the plate 42 and the bobbin 34; and a magnet 38 fixed to the end of the yoke 35. The second speaker 13 may form a magnetic circuit by the yoke 35, the magnet 38, and the voice coil 32 wound around the bobbin 34.

In some embodiments, a direction of a current flowing through the voice coil 31 of the first speaker 12 may be the same as a direction of a current flowing through the voice coil 32 of the second speaker 13. The first speaker 12 and the second speaker 13 may be coupled to the same amplifier 23. The currents based on the same audio signal flow to the voice coils 31 and 32 at the same timing or simultaneously.

With this structure, a force that vibrates in the vehicle width direction of the vehicle 11 may be applied to the bobbins 33 and 34 as indicated by an arrow 18, in accordance with the Fleming's left-hand law based on the magnetic circuits. As described above, the bobbins 33 and 34 may have the integrated structure via the yoke 35, and the bobbins 33 and 34 may also vibrate in the same direction by the currents flowing in the same direction in the voice coils 31 and 32.

Referring to FIG. 3B, a vertical axis represents a sound pressure (dB), and a horizontal axis represents a time (t). In the first speaker 12, a cone 40 may be coupled between the bobbin 33 and the frame 36. In the second speaker 13, a cone 41 may be coupled between the bobbin 34 and the frame 39. An operation of the bobbins 33 and 34 may also cause the cones 40 and 41 to vibrate in the same direction in the vehicle width direction of the vehicle 11.

When the bobbins 33 and 34 move to the right side of the vehicle 11, the cone 40 may expand in a direction in which the cone 40 is pushed out with respect to the frame 36, thus outputting the notification sound to the outside of the vehicle 11, whereas the cone 41 may expand in a direction in which the cone 41 is drawn with respect to the frame 39, thus outputting the notification sound toward the inside of the vehicle 11. In contrast, when the bobbins 33 and 34 move to the left side of the vehicle 11, the cone 41 may expand in a direction in which the cone 41 is pushed out with respect to the frame 39, thus outputting the notification sound to the outside of the vehicle, whereas the cone 40 may expand in a direction in which the cone 40 is drawn with respect to the frame 36, thus outputting the notification sound toward the inside of the vehicle 11.

The vibration of the bobbins 33 and 34 in the same direction may cause the notification sound to be outputted from the first speaker 12 and the notification sound to be outputted from the second speaker 13 to have opposite phases with respect to each other as illustrated in FIG. 3B. Thus, the notification sounds outputted from the first speaker

12 and the second speaker 13 toward the inside of the vehicle 11 may cancel out each other and offset each other, which helps to greatly reduce the notification sound that enter the inside of the vehicle 11. This also achieves the notification sound that meets the applicable requirements of laws or regulations for the outside the vehicle, and helps to ensures quietness for a vehicle compartment of the vehicle 11. Accordingly, an occupant of the vehicle 11 is able to enjoy, for example, a conversation, music, or the like, which helps to achieve a comfort upon traveling of the vehicle 11.

Referring to FIG. 4, the following requirements are defined in the sound pressure measurement test according to the Japanese laws or regulations. For a forward movement of the vehicle 11, microphones 51 are to be installed at a height of 1.2 meters from the ground at respective locations on both sides of the right and left ends of the vehicle 11, i.e., on both sides of a front end of the vehicle 11. The locations are two meters away from the center line CL in the vehicle width direction. Under such conditions, a measurement is performed as to whether the notification sound has a sound pressure equal to or higher than 45 dB. For a backward movement of the vehicle 11, the microphones 51 are to be installed at the height of 1.2 meters from the ground at respective locations on both sides of the right and left ends of the vehicle 11, i.e., on both sides of a rear end of the vehicle 11. The locations are two meters away from the center line CL in the vehicle width direction. Under such conditions, a measurement is performed as to whether the notification sound has the sound pressure equal to or higher than 45 dB.

Upon the backward movement of the vehicle 11 that includes the vehicle control apparatus 10 according to the example embodiment, the notification sounds to be outputted from the first speaker 12 and the second speaker 13 provided at the front part of the vehicle 11 are to meet the sound pressure measurement test. In order to meet the requirements of the sound pressure measurement test, the notification sound may be outputted at the sound pressure higher than the sound pressure of 45 dB.

Accordingly, the notification sounds outputted from the cones 40 and 41 as a result of the expansion in the directions to be drawn toward the vehicle compartment of the vehicle 11 can also increase. However, the notification sounds outputted from the first speaker 12 and the second speaker 13 toward the vehicle compartment of the vehicle 11 cancel out each other and offset each other, which helps to greatly reduce the notification sound that enter the inside of the vehicle 11.

In the vehicle control apparatus 10 according to the example embodiment, the bobbins 33 and 34 may be formed in the linear shape, and the axial center of the bobbin 33 of the first speaker 12 and the axial center of the bobbin 34 of the second speaker 13 may be coaxially positioned in the vehicle width direction of the vehicle 11; however, any embodiment of the disclosure is not limited thereto. In some embodiments, respective ends of bobbins 33A and 34A to which the cones 40 and 41 are respectively coupled may be obliquely bent or curved forward as illustrated in FIG. 5. This configuration helps to easily deliver the notification sound to a person such as the pedestrian at the front of the vehicle 11. Also in this case, the first speaker 12 and the second speaker 13 may be disposed line-symmetrically with respect to the center line CL of the vehicle 11 in the vehicle width direction indicated by the dashed-dotted line 16.

Further, as illustrated in FIG. 3A and FIG. 5, the first speaker 12 and the second speaker 13 may be disposed line-symmetrically with respect to the center line CL of the vehicle 11 in the vehicle width direction indicated by the dashed-dotted line 16; however, any embodiment of the disclosure is not limited thereto. In some embodiments, when an effect of reducing an amount of entry of the notification sound into the vehicle 11 is to be achieved for a driver who drives the vehicle 11, the first speaker 12 and the second speaker 13 may be disposed line-symmetrically in the vehicle width direction of the vehicle 11 in front of a steering wheel of a driver's seat. In addition, disposing at least the first speaker 12 and the second speaker 13 to oppose each other in the vehicle width direction of the vehicle 11 may allow the notification sounds outputted from the first speaker 12 and the second speaker 13 toward the inside of the vehicle 11 to cancel out each other and offset each other, which helps to achieve the effect of reducing the amount of the entry of the notification sound into the vehicle 11.

Further, in the vehicle control apparatus 10, the yoke 35 and the magnet 38 may be shared by the first speaker 12 and the second speaker 13, and the first speaker 12 and the second speaker 13 may be integrated with each other in structure; however, any embodiment of the disclosure is not limited thereto. In some embodiments, the first speaker 12 and the second speaker 13 may be provided as separate structures and disposed line-symmetrically with respect to the center line CL of the vehicle 11 in the vehicle width direction indicated by the dashed-dotted line 16.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The vehicle control processor 21 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle control processor 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle control processor illustrated in FIG. 1.

The invention claimed is:

1. A control apparatus for a vehicle, the control apparatus comprising:

a first speaker disposed at a front part of the vehicle and toward a right side in a vehicle width direction of the vehicle, the first speaker being configured to output a notification sound, the notification sound being configured to notify surroundings of the vehicle of an approach of the vehicle;

a second speaker disposed at the front part of the vehicle and toward a left side in the vehicle width direction, the second speaker being configured to output the notification sound, wherein; and an amplifier, wherein the first speaker and the second speaker are opposed to each other in the vehicle width direction and comprise an integrated structure with respect to each other, the integrated structure comprising a single yoke shared by the first speaker and the second speaker, wherein the first speaker comprises a first voice coil through which a current for an audio signal is to flow, and a first bobbin around which the first voice coil is wound, wherein the second speaker comprises a second voice coil through which the current is to flow, and a second bobbin around which the second voice coil is wound, wherein a direction of the current to flow through the first voice coil is same as a direction of the current to flow through the second voice coil, wherein the first bobbin and the second bobbin are each mounted to the single yoke, comprise the integrated structure via the single yoke, and are configured to vibrate integrally in the vehicle width direction, and wherein the amplifier is a single amplifier, and the first speaker and the second speaker are each connected to an output of the single amplifier to simultaneously receive a same audio signal on which the notification sound is based.

2. The control apparatus for the vehicle according to claim 1, wherein the first speaker and the second speaker are each disposed in a perpendicular direction with respect to a center line of the vehicle in the vehicle width direction, and are disposed line-symmetrically with respect to the center line.

3. The control apparatus for the vehicle according to claim 1, wherein the first speaker and the second speaker are each disposed obliquely toward a front of the vehicle, and are disposed line-symmetrically with respect to a center line of the vehicle in the vehicle width direction.

4. The control apparatus for the vehicle according to claim 1, wherein a magnet is shared by the first speaker and the second speaker together with the single yoke.

5. The control apparatus for the vehicle according to claim 1, wherein an axial center of the first bobbin and an axial center of the second bobbin are coaxially positioned in the vehicle width direction.

6. The control apparatus for the vehicle according to claim 1, wherein the first speaker and the second speaker are disposed in a tuft between a front grille and a radiator of the vehicle.

7. The control apparatus for the vehicle according to claim 1, wherein a cone is coupled between the first bobbin and a frame of the first speaker and a cone is coupled between the second bobbin and a frame of the second speaker, and notification sounds output toward an inside of the vehicle from the first speaker and the second speaker are in opposite phases to each other so as to reduce entry of the notification sound into the vehicle.

*     *     *     *     *